United States Patent [19]
Tourangeau

[11] Patent Number: 5,931,998
[45] Date of Patent: Aug. 3, 1999

[54] PROCESS FOR PREPARING COLORED MINERAL POWDERS BY CHEMICAL TREATMENT

[76] Inventor: Paulette Tourangeau, 25, avenue de l'Epée, apt. 11, Outremont, Canada, H2V 3S8

[21] Appl. No.: 08/733,237

[22] Filed: Oct. 8, 1996

[51] Int. Cl.⁶ .................................................. C09C 1/32
[52] U.S. Cl. ........................ 106/414; 106/400; 106/401; 106/419; 106/433; 106/434; 106/439; 106/440; 106/441; 106/450; 106/453; 106/456; 106/458; 106/459; 106/464; 106/466; 106/470; 106/486; 523/200
[58] Field of Search ..................................... 106/400, 401, 106/414, 419, 433, 434, 439, 440, 450, 451, 453, 456, 458, 459, 464, 466, 470, 486; 523/200

[56] References Cited

U.S. PATENT DOCUMENTS

| | | | |
|---|---|---|---|
| 3,936,188 | 2/1976 | Sawyer | 356/36 |
| 4,749,869 | 6/1988 | Fournier | 250/492.1 |
| 5,084,909 | 1/1992 | Pollak | 378/64 |
| 5,637,878 | 6/1997 | Herer et al. | 250/492.3 |

OTHER PUBLICATIONS

"Classification and Chemical Description of the Complex Inorganic Color Pigments" 3rd ed., Dry Color Manufacturer's Association, pp. 37–40, Dec. 1991.

"Pigments (Inorganic)", Kirk–Othmer Encyclopedia of Chemical Technology, 3rd ed., vol. 17, J. Wiley&Sons, NY, pp. 788, 789, 794–836, Dec. 1982.

*Primary Examiner*—Mark L. Bell
*Assistant Examiner*—Scott L. Hertzog

[57] ABSTRACT

Disclosed is a system of natural colors consisting of thousands of colored powders of mineral origin and of materials in or on which pigments have been applied and, afterwards, submitted to at least one thermal treatment and/or irradiation. These natural colors cover the totality of the visible spectrum and offer a great variety of tones, tints and reflections from white to black, including all the rainbow colors. The powders of this system are obtained by mechanical, chemical, thermal and/or physical processes and are used alone or in combination. They are particularly useful to color materials and, more especially those used in the construction and architectural fields.

5 Claims, No Drawings

PROCESS FOR PREPARING COLORED MINERAL POWDERS BY CHEMICAL TREATMENT

FIELD OF THE INVENTION

The present invention relates to new colouring powders forming a system of natural colours, covering the totality of the visible spectrum and offering an enormous variety of tints, tones and reflections, from white to black while including all the rainbow colours.

The invention also relates to the preparation of these new powders.

The invention further relates to the use of these new powders as pigments to colour materials, notably those usable for decorative or ornamental purposes and, more precisely, those that can be used in the building and architectural areas.

In the description and the following claims, when we use the expression "colour system", we mean an ensemble of natural colours, organized in a manner which is logical, viz. according to the natural order of the rainbow colours, beginning with white and ending with black. This system includes colours occurring in a pure state (obtained without being mixed with any other powder) that may be said "flat", viz. they do not have any tint or show any reflection. It also includes colours in a pure state, which may have tones, tints and/or reflections. It further includes mixtures of two or more of these colours. From a practical standpoint, these colours occur in the form of powders directly usable as pigments, or of materials in or on which powders have been applied and, afterwards, submitted to one or more thermal treatment(s) and/or one or more irradiation(s).

HISTORY OF THE INVENTION

The present invention originates in a fruitless research which the inventor, Paulette Tourangeau, started many years ago, with the intention of obtaining pigments of very specific colours, which could be used to prepare paints having corresponding colours, without having to mix any of these pigments together in order to obtain these colours. This research allowed her to conclude that although many natural minerals or industrial pigments are available in the nature and on the market, the range of colours that they provide does not cover, far from it, the whole visible spectrum. Thus, for example, there are practically no blue or green pigments available.

With the support of many universities and public organizations, the inventor worked extensively in order to create new pigments corresponding to the missing colours.

By systematically doing chemical tests, using more or less prolonged treatments with acids or other reagents and/or heat, and/or physical tests using more or less prolonged irradiations of certain minerals with X rays or gamma rays before or after their integration into the materials to be coloured, she discovered that it is possible to obtain powders or coloured materials of practically all tints, tones and textures, which together form an almost infinite range of natural colours.

A detailed list of all the powders and the coloured materials which were so prepared, is given in the annexed Table I. Hence, Table I, as well as the other annexed tables, form an integral part of the present specification. In Table I, the powders and coloured materials are numbered from 1 to 10,104 and are classified according to their colours and their tonalities in the following order: white (including white, ivory and cream), lilac, violet, blue, green, yellow, orange, pink, red, beige, brown, grey and black.

For each powder or material, one may find the colour, the tone and the tint obtained; the identification number given to this powder or material; the name of the mineral used as starting material to obtain the coloured powder; its origin; the colour of this mineral as a rock and when grinded to a powder, before it is subjected to any treatment; the name of the metal(s), mineral(s) or compound(s) which were used eventually for the treatment; when the case arises, the name and the composition of the material on or in which the powder(s) was (were) applied; and, finally, the process used to obtain the given colour.

Some of the listed powders are "natural" products or result from the plain mixing of "natural" products. By "natural" products, we mean powders that did not undergo any treatment, apart from a mechanical grinding and a possible mixing with one or more other powders which have not been treated. Therefore, there are products that can be found in nature as such and are not "new", or products that are obtained by the plain mixing of products which are not new. All these products, which are not new and, whose identification numbers appear in annexed Table II, are excluded from the scope of the present invention.

Other powders listed in Table I, are not natural products, but they are, however, existing products described in publications or available on the market. These other powders, whose identification numbers appear in annexed Table III are also excluded from the scope of the present invention.

OBJECTS AND SUMMARY OF THE INVENTION

Therefore, a first object of the present invention is to provide new coloured powders that can be used as pigments. These powders are obtained by chemical, heat and/or physical (irradiation) treatment(s) carried out before or after their application. The powders which thus constitute the first object of the invention, are listed in Table I. However, the powders whose numbers appear in tables II and III are excluded from the scope of the present invention.

Among the coloured powders which constitute the first object of the invention, many of those listed in Table I are a priori new, though less original than the others. These powders, whose identification numbers appear in annexed Table IV are not excluded from the scope of the invention, but are excluded from some of the appended claims.

A second object of the invention is also to provide a colour system consisting of the ensemble of coloured powders usable as pigments and of the materials in or on which coloured powders have been applied and, afterwards, submitted to one or more heat treatment(s) and/or one or more irradiation(s). More precisely, the second object of the invention is to provide a system of colours consisting of powders usable as pigments and of materials pigmented and treated thermally and/or irradiated, whose colours extend on almost all the visible spectrum. This system consists of the ensemble of powders and materials of different colours listed in Table I, except, however, for the powders whose numbers appear in Tables II and III.

A third object of the invention is to provide a method of using as a pigment each of the coloured powders of the system of colours mentioned hereinabove.

DETAILED DESCRIPTION OF THE INVENTION

As previously mentioned, an object of the invention is to provide a system of colours consisting of an ensemble of coloured powders of mineral origin, obtained par mechanical, heat, chemical and/or physical processes and the materials in or on which mineral powders have been applied and, afterwards, submitted to one or many heat treatment(s) and/or one or many irradiation(s). This system is particularly original in so far as the colours of the powders and the materials composing it cover almost all the visible spectrum and offset an almost infinity of tints, tones and reflections.

The nature of each powder of the system according to the invention and their method of preparation are fully defined in Table I, as it has already been explained hereinabove.

The powders of the colour system according to the invention are usable as pigments in many areas. Among their possible uses, the colouring of modern architectural materials is certainly the most interesting one due to the mineral origin of the powders.

In this connection, it is worth noting that the great majority of the pigments or colours used industrially are of a purely organic type and are generally obtained from products derived from petroleum. The few inorganic pigments, which are used industrially are essentially iron, chromium, cadmium, zinc, molybdenum and titanium oxides, which have been subjected to stabilization treatments, generally of thermal nature.

For example, the textile industry and the ink manufacturers use almost exclusively organic pigments or colours, especially, in the first case, because of their capacity of penetration into the fibers and, in the second case, because they can be mixed to thus obtain a superposition of colours. The paint manufacturing industry mainly uses inorganic pigments, because they resist better to light and to the passage of time. The plastic industry uses both of them. Nevertheless, it is a fact that organic pigments are those which have been the most explored during the last fifty years. In fact, organic colours, mostly petroleum derivatives, are being used in most fields. Consequently, the use of minerals as colours or pigments, remain almost unexplored still today mostly because of the poor choice of colours which they offer.

The present invention provides a remedy for this lack by offering a complete system of mineral colours usable in all areas, although preferably for the colouring of modern architectural materials.

The expression "modern architectural materials" include all the materials used in the three main planning areas, that is to say:

1) architecture as such, viz. the elements composing the structure of a building or its complementaries, such as for example the windows;
2) interior planning, viz. the covering of the interior walls of a building, its furniture, the wallpaper, the hangings, etc . . . ; and
3) the exterior planning, such as, for example, the exterior covering of a building.

Among the materials which may be so coloured and used on a large scale to manufacture structural elements of buildings, one may mention concrete, resins, polymers and other plastic materials.

Among the materials which may be coloured and are related to interior or exterior planning, one may mention arborite, ink, paper paste, glass, ceramic, tissues or metallic coverings, especially those basically composed of aluminum, stainless steel, galvanized sheet, black sheet, copper, brass, etc . . .

In accordance with the present invention, colouring tests of these materials with many of the powders listed in Table I were done. Some of these tests were done on the material which was already manufactured. Others were done on the material, during its manufacturing. These tests, many of which will be explained in detail hereinafter, have shown that many of the obtained powders are usable as mineral pigments onto and/or into architectural materials. This double use of a same pigment in and on a same material is evidently interesting on an economical standpoint.

If the use of the powders according to the invention as pigments for the colouring of the modern architectural materials is very interesting and promising, it is however worth mentioning that the present invention is not restricted solely to this use. Thus, the powders according to the invention may also be used as pigments in many other areas that are not directly related to the building planning field. For example, they could also be used for the colouring of the paints used to draw the lines on the highways. The powders according to the invention could also be used not only as pigments to obtain the desired colouring but also to obtain interesting mechanical characteristics, such as, for example a better resistance to the friction of the tires of the cars. Consequently, they could diminish the wearing out of the lines, thus reducing the need to frequently renew them. The powders according to the invention could further be used as pigments in plaster, rubber, linoleum, slate, make-up, mosaics for the floors, chalks (pastels and wax), colouring pencils, artistic paints, etc . . .

As one may note, the coloured powders according to the invention allow for diversifying the use of many minerals or, still, revealing uses of minerals which did not yet have any. This ensemble of powders may also contribute to regenerate certain mining areas, like for example the one of asbestos which, when it is transformed into a pigment as is proposed in accordance with the invention, does not have any more the menacing aspect it has as a fiber which is said to be harmful dust for the lungs. One may also mention molybdenite, numerous mines of which have been abandoned in Quebec because its uses have become outdated. And still, one may mention that many other minerals have never been used so far as colours or for any other purpose.

PREPARATION OF THE COLOURED POWDERS ACCORDING TO THE INVENTION

As it may clearly be seen in Table I, the coloured powders according to the invention are obtained by processes known as such, which are used either alone or in combination.

These processes may be:

purely mechanical (grinding, mixing, . . . );
purely thermal (heating or calcination);
purely chemical (reaction with acids, ammonia or other reagents);
purely physical (irradiation with UV, IR, gamma rays, . . . ); or
a combination of one or more of the processes mentioned above, in any order.

Mechanical Process

"Mechanical process", means the grinding, sifting and optional mixing of one or more powders.

The powders obtained by a purely mechanical process (plain grinding and optional mixing with one or many other powders) are listed in annexed Table II and are, on a practical standpoint, excluded from the appended claims.

As non-restrictive examples of the implementation of this process, one may refer to the description given in Table I of the products numbered 41, 138, 2463.3, 3215.3 or 6932.

Heat Process

The heat process used for the synthesis of many of the powders according to the invention, consists essentially in the heating or calcinating of a mineral or a mixture of minerals at a temperature which may reach up to 2300° F. for a period ranging from 30 minutes to 10 hours. This process transforms the colour or the quality of colour of the mineral (s) that is (are) treated. It multiplies the number of colours which may be obtained from a same mineral. It destroys the impurities in the mineral and increases its resistance to degradation caused by the microfauna or microflora possibly present in it. The source of heat may be a furnace, a direct flame such as a torch, a laser beam or any other heating means. This process may be applied to all minerals. It can be carried out in ambient air or in an inert atmosphere and its duration and temperature may be controlled.

From a practical standpoint, the mineral may be in a rock or powder state. It may also be either in a pure state or mixed with one or many other mineral(s) or metal(s). This mineral may be humidified and/or stirred before, during or after the treatment in order to vivify the colour and, sometimes, even to modify it. The cooling may be quick or slow. The process may also include alternate periods of heat treatment and cooling (see powders 783 and 4245-6 in Table I).

It is worth mentioning that variations in the modalities of the heat treatment will cause variations in the colour or the quality of colour. In fact, the number of these variations is infinite. However, a heat treatment which is too long, may cause the mineral to dry up and calcine.

It is also worth mentioning that, generally, minerals of all types have threshold temperatures where changes of colour occur. Between these threshold temperatures, only changes in the quality of colour occur. These threshold temperatures vary, of course, according to the type of mineral that is treated.

By way of non-restrictive examples of implementation of this process, one may refer to the description of the powders numbered 144 (classic heat treatment), 783 (heat treatment with a controlled duration) and 3947 (heat treatment in an inert atmosphere) in Table I.

The previous description referred exclusively to the direct treatment of preselected minerals. However, the same process may be used successfully after application of the minerals in or on a material, which is to be coloured. Once this application is completed, one obtains a given colour or quality of colour. After heat treatment of said material, one obtains another colour or quality of colour. Therefore, there is a transformation of the powder in the material, resulting in a simultaneous transformation of colour.

This is interesting considering the fact that the colour obtained after heat treatment, often differs from the one obtained when the same mineral is heat treated under the same conditions, but independently from the material. Therefore, this process multiplies the colours that may be obtained with a same mineral.

The materials which can be so-treated are numerous. Polyester resin, cement, metal, porcelain, glass and stone are included.

The modalities of application are extremely variable. The mineral may be applied and heat treated in the material or on it or, sometimes (as in the case of galena with cement), both in and on it. The heat treatment can be carried out either in ambient air or in a controlled atmosphere. This treatment can be carried out at various temperatures. In some cases, there is one or more threshold temperatures at which the reaction occurs (see the notes 758-9 in Table I). The conditions of cooling and rise of the temperature may vary. The heat source may also vary.

By way of non-restrictive examples of implementation of this heat process after application on or in a material, one may refer to the description given in Table I of the powders no. 3507 to 3512 (after application on stone); 5047.1 (after acid treatment and application in a polyester resin); 1563.1 (after acid, heat and ammonia treatments and application in a polyester resin); 1573 to 1576 (application on metal); 2466 (application on glass); 1519 (application in cement); etc.

Chemical Process

By chemical process, there is meant a treatment of one or more minerals either alone or mixed with other additives, with a reagent such as a strong acid, ammonia, cyanide, ether, etc.

This process transforms the colour or the quality of colour of the mineral. Consequently, it multiplies the number of colours that one may obtain with the same mineral and/or metal. Actually, different proportions of mineral and reagent will give different colours or qualities of colour (see notes 313 and 392 in Table I).

The treatment with the acids may be carried onto in an acid bath with only one acid or a combination of acids chosen among nitric, hydrochloric, sulphuric, thiophosphoric, tartaric, acetic and hydrofluoric acids. The colours or qualities of colour of a same mineral vary from one acid to another and/or from one combination of acids to another. The treatment may be carried out in ambient air and its duration may vary from immediate withdrawal to many years. The duration of the soaking also determines the colour or the quality of the colour (see notes 76, 261, 296, 352a and 487-8 in Table I).

The distribution of the mass of mineral, either horizontally or vertically (in the form of a column) in the acid bath influences the colours obtained with certain minerals (see notes 438, 510, 512 and 516 in Table I).

The drying may vary and determine the colour (see notes 33, 70, 442 and 484 in Table I). This drying may be natural or carried out on a hot plate, in a furnace, in a drying oven or on a sand bath. During the drying phase, one may vary the temperature in order to dry the solution or, still, bring it to the boiling point (see note 246 in Table I) and then remove or maintain it. A too high heating may scorch or darken certain minerals. The colour of some minerals becomes more intense when heating is very high.

The type of drying and its modalities also cause variations of colours and of qualities of colour. Thus, for example, the duration of the drying on a hot plate may determine the colour. It may make the colour or quality of colour vary in a positive or negative manner (see notes 481 and 625 in Table I).

Therefore, the acid treatment transforms profoundly and durably the colour or the quality of the colour of the mineral(s). This treatment allows to obtain colours which cannot be found among the natural minerals. Notably, it also allows to obtain unusual, diversified and pure colours, viz. colours that do not result from a mixing with other minerals or chemical or with metallic compounds. In this connection, it should be noted that all the minerals treated with thiophosphoric acid, became fluorescent.

From a practical standpoint, the mineral which is preferably but not necessarily reduced to a powder state or is in the state of a stone, may be treated in ambient air or in a controlled atmosphere. The quantity of mineral may be chosen as may be the quantity of acid used for the treatment. However, one must be sure that the mineral is entirely covered. Variations in the respective proportion of the mineral and acid will give variations in the colour or the quality of colour. Likewise, variations in the method which is used (duration of the soaking and/or the drying; nature of the acid(s) bath used [the acids may be fresh or used]); the degree of dilution of the bath; the use of only one acid or of a mixture of acids; the use of a single treatment or of successive treatments with the same acid, many different acids or, even, other reagents, such as ammonia, etc.) will bring variations in the colour or the quality of colour.

The proportions of mineral and acid(s) may therefore vary, as well as the duration of the soaking and the drying conditions. The different combinations of operative conditions, will give different colours. These observations apply to all minerals treated with acid.

As previously mentioned, the powder obtained by treatment of a mineral previously heated or not, with an acid or a combination of acids may be taken and treated again with another reagent, such as ammonia, according to the various modalities presented above. Such powder may also be calcinated at various temperatures in ambient air or in a controlled atmosphere. When the mineral is calcined before and/or after the acid treatment, either in ambient air or in a controlled atmosphere, such can be done under the above mentioned conditions (see the above chapter entitled "Heat Process").

By way of non-restrictive examples of implementation of this process of chemical treatment with an acid, one can refer to the description given in Table I of the powders numbered 2, 5 or 7 (treatment with acid only), 1143 or 1357 (treatment with acid and heat treatment) or 1122 or 1149 to 1151 (acid treatment, with heat treatment and further treatment with ammonia).

Instead of using one or more acids, one may use other reagents such as, for example:

ether in which the mineral may be soaked for a given time, the drying being natural—see, by way of non-restrictive examples, the description given in Table I of the powders numbered 66, 71 and 3004 (treatment with ether only), 5664 (heat treatment and, afterwards, with ether) and 1050.1 (treatment with acid and, afterwards, with ether);

ammonia, with which, as with the acids, variations in the treatment conditions will give different colours or qualities of colour—see, by way of non-restrictive examples, the description given in Table I of the powders numbered 67, 187 and 4164 (treatment with ammonia only); 1360 and 9964 (heat treatment and treatment with ammonia), . . . ;

cyanide—see, by way of non-restrictive examples, the description given in Table I of the powders numbered 1359, 2626 and 4151.

Physical Process (Irradiation)

Treatment by irradiation is applicable to all minerals, either as such or in admixture with other, with the exception, however, of those of the "gem" type, for which test treatments by irradiation have seemingly been carried out in the past. By minerals of the "gem" type, there are meant the minerals used in jewellery, with the exception of gold and silver. These minerals include in particular corundum, spodumene, beryl, agate, zircon, garnet and tourmaline.

The treatment by irradiation, which is also applicable onto materials including minerals, transforms the colour or quality of colour of said minerals. For certain minerals, changes in texture, structure (crystallization) or, still, transparency sometimes accompany the change in colour or quality of colour.

Many different types of irradiation, can be used, such as X-rays, gamma-rays, electrons and neutrons, as well as laser beam. One may also irradiate a same mineral successively with a first type of irradiation and, afterwards, with a second type of irradiation. By way of non-restrictive examples of such a combination of irradiations, one may refer to the description given in Table I of the powders numbered 861 (electrons and gamma-rays), 1097 and 3225 (electrons and neutrons), 8068 and 10038 (neutrons and gamma-rays) and 8538 (X-rays and electrons).

Generally, the irradiation may be carried out in a continuous or discontinuous manner in ambient air or in a controlled atmosphere. The minerals may be irradiated either at normal temperature or after having undergone heat treatment. A same mineral irradiated at various doses, will give a range of colours or of qualities of colour. The reaction of the mineral to irradiation varies from one type of mineral to another. The colours of some minerals are transformed or slightly accentuated by every increase of the dose applied to them. This process is sometimes accompanied by significant modification thresholds. Certain minerals, originally colourless, become coloured when irradiated.

a) Gamma Irradiation

Conclusive tests were done at doses ranging from 0,01 to 600 Mrad.

More precisely, tests carried out in a UC-15 calibrator at the Canadian Irradiation Center (Armand Frappier Institute) at varying doses that totalized up to 600 Mrad. Glass bottles or fabric bags containing the minerals were inserted in the calibrator. The irradiation was continuous or discontinuous and showed evidence that it is possible to form ranges of colours or qualities of a colour with a same mineral by exposing it to different doses of irradiation. This process made the colour of the mineral to evolve through different doses of irradiation.

Other tests were carried out in a Gammacell® 220 manufactured by Atomic Energy of Canada Limited, with a cobalt-60 source of 6360 Curies. The certificate of measure of this apparatus indicated $5.01 \times 10^5$ 2.1% rad by hour.

By way of non-restrictive examples of implementation of this process, one may refer to the description given in Table I of the powders numbered 1013.1; 2361 a; 2996; 3300 to 3304 and 7153 to 7164.

b) Neutron Irradiation

In this case also, conclusive tests were carried out in a flux of slow thermic neutrons, during approximately 5 hours in the reactor of the Mc Master University in Hamilton, Ontario, at $10^{12}$ neutrons/cm²/sec. The samples of different minerals were put in individual plastic capsules and fed into the reactor.

Other tests carried out in a mixed flux of neutrons and gamma-rays in the nuclear reactor of the "Institut de génie énergétique" at the École Polytechnique in Montreal. Samples of the same minerals were treated in the reactor with a flux at $10^{12}$ neutrons/cm²/sec during different times, in order to form a range of colours or of qualities of colour. An irradiation of 1,667 rad per second was emitted.

By way of non-restrictive examples, one may refer to the description given in Table I of the powders numbered 4668, 5914, 8501 to 8506 and 9554 to 9561.

c) Electron Irradiation

Conclusive tests carried out in the Radio-oncological Departments of the Montreal's General Hospital and Notre Dame Hospital in Montreal on minerals which were treated either in the state of powders inserted in gelatine capsules, or in the form of stone.

The stones or capsules were placed at a short distance from the collimator of a Clinac® 18 apparatus producing electrons at 18 and 20 MeV. The total doses applied ranged from 50,000 to 170,000 rad at a degree of application of 5 to 500 Mu (monitor unit) per minute.

Still in this case, the colour of the tested minerals evolved according to the intensity and duration of the irradiation.

By way of non-restrictive examples of implementation of this process, one may refer to the description given in Table I of the powders numbered 2995, 3099 to 3102, 8440, 8441 to 9227 and 9228.

d) X-Rays

Conclusive tests carried out at the "Laboratoire de diffraction des rayons X" of the Chemistry Department at the University of Montreal. The equipment used consisted in a Philips® generator operated with a copper tube. The conditions of its use were standard, viz. a 20 mA current was applied under a 40 kV voltage. Each sample was treated separately and its exposition lasted for seven days. Each sample was put in a separate sample holder placed directly at the outlet of the primary beam of the generator.

Other tests were carried out at Sainte-Justine Hospital in Montreal. More precisely, 139 minerals, samples of polyester resin, of transparent and opaque white enamel paint, as well as samples of transparent and opaque white ink, which were all pigmented with minerals, were irradiated by X-rays with a Philips® therapeutic apparatus, operating a radiogene tube in tungsten, usually used for medical purposes, during 4 hours at a rhythm of 448 shots at an interval of 30 seconds during $\frac{1}{10}$ of a second at 100 milliamperes and 70 kV at a distance of 40 inches.

By way of non-restrictive examples of implementation of this process, one may refer to the description given in Table I of the powders numbered 3840, 3907 and 8538.

e) Laser Irradiation

Conclusive tests were done in the laboratory of the "Laser-Matter" group at INRS-Energie, with a Lumonics® excimer laser model Hyper EX-400, the amplification medium of which was composed of a gaseous mixture of krypton and fluor (KrF). This laser emits a coherent multi-mode UV irradiation having a 249 nm wavelength, which is transmitted in the form of impulsions having a duration of 30 nanoseconds and an energy of approximately 200 mJ. This laser functions at a rate of repetition of 20 Hz.

Two different sources were used. The only differences between the two lasers used for these experiments were in the structure of the beam and, in no case, such affected the results. In one case, the beam had the form of a square of 2 cm×2 cm at the outlet of the laser and had a divergence of approximately 0.4 Mrad. A lens having a focal length of 30 cm was used, in order to concentrate the laser beam on the sample which should be irradiated. Thus, one could reach a maximum density of strength of 10 10 W/cm 2. In another case, the beam had a rectangular form of 2.3 cm×0.6 cm and its divergence was inferior to 0.2 Mrad. A lens having a focal length of 30 cm was used, in order to concentrate the laser beam on the sample which should be irradiated. Thus, one could reach a density having a maximum strength of the order of 10 10 W/cm2.

The intensity of the radiation reaching the sample could be modified by moving the sample away from the lens or bringing it closer. The energy of the beam was measured with the help of a Scientech® 365 calorimeter before and after irradiation.

From a practical standpoint, the tested samples were irradiated until a change was observed or until it was damaged. The duration of exposition varied from 0.5 min to 35 minutes; the irradiated surface was of 0.0025 $cm^2$ at 0.7 $cm^2$; the laser energy of 0.160 J to 0.245 J; the flux of 2.8 W×$10^9$ $cm^2$ to 1.0 W×$10^7$ $cm^2$ and the total energy of 2.2 J to 1300 J.

By way of non-restrictive examples of implementation of this process, one may refer to the description given at Table I of the powders numbered 3062, 3395, 3519, 3541, 5906, 5944, 7181-2 and 9941.

f) Treatment by Irradiation After the Application on or in a Material

As in the case of the heat process, the treatment by irradiation may be used successfully after application of the minerals in or on the material to be coloured.

When one applies a mineral on or in a material, he or she does not necessarily obtain an interesting colour result (ex.: colourless, light cream, light grey, light beige). If he or she then proceeds with an irradiation, a transformation of the colour or quality of colour may be obtained. In most cases, a mineral irradiated independently from a material, gives a colour or quality of colour which may either differ totally or be similar to the one obtained when the same mineral is applied in the material and, afterwards, irradiated. Furthermore, the colour or quality of colour obtained after irradiation differs from one material to another and, moreover, from one type of irradiation to another. Therefore, the implementation of this process permits to transform the colour of minerals after their application in a material, either radically or moderately.

The conditions of implementation of this treatment are similar to those previously described. The treated materials can also be treated thermally before they are irradiated. The irradiation can be carried out in ambient air or in a controlled atmosphere. It can also be carried out at a variety of doses. Among the sources of irradiation that can be used, one can cite X-rays, gamma-rays and electrons. Other sources of irradiation may also be used.

By way of non-restrictive examples of implementation of this process, one may refer to the description given in Table I of the powders numbered 923.2 (after application in PYREX®); 6819.1 (after heat treatment, acid treatment and application in PYREX®); 3064 (after application on cement and heat treatment); 3142 (after application in cement and heat treatment); 657 (after heat treatment, acid treatment and application in a concrete polymer); 511 to 513 (after acid treatment and application in polyester resin); 530-1 (after application in ink); 586 (after application in enamel); etc.

APPLICATION OF THE COLOURED POWDERS ACCORDING TO THE INVENTION

As previously mentioned, the powders of the colour system according to the invention are usable as pigments in numerous fields, but more specially for the colouring of architectural materials. Numerous examples of coloured materials according to the invention have already been mentioned (see the above description of the "thermal process" and "physical process"). The following additional examples will illustrate in a non-restrictive manner other possible applications of the powders of the system according to the invention.

EXAMPLE No. 1

Application of Coloured Powders as Pigments on Plastic

Tests of application of many coloured powders according to the invention were carried out on many different plastics, including UVEX®, polystyrene, acrylic and polycarbonate. The powders, which have been thus tested are those numbered 11, 34, 92, 96, 526, 537, 563, 581, 603, 607, 621, 1138, 2207 and 4226 in Table I.

First Method of Application a) 1 g of each pigment, reduced to the state of powder, was applied as a pigment on the surface of a square piece of each plastic, measuring 1"×1".

b) These pieces were then put in rows on an asbestos sheet and heated up to the "formability" temperature of each plastic:

1) UVEX®: between 265 °F. and 320° F. for an average of 292° F.; it starts to deform at 77° C.
2) Polysterene: between 365° F. and 385° F. for an average of 375° F.; it starts to deform at 200° F. and higher.
3) Polycarbonate: between 440° F. and 475° F. for an average of 457° F.; it starts to deform at a maximum of 325° F.
4) Acrylic: between 260° F. and 360° F. for an average of 310° F.; it starts to deform between 71° C. and 95° C.

c) The deposited mineral pigments remained in suspension at the surface of the plastic material. Then, they were covered with a layer of transparent catalysed resin in order to fuse them with the plastic material to which they were already glued under the action of heat.

Second Method of Application 1 g of coloured powder was grinded with a transparent resin. The coloured resin that was so obtained was uniformly applied afterwards in a thin layer on the four plastic material.

Third Method of Application

Pieces of the same four plastic materials, measuring 1"×1", were prepared.

A small quantity of coloured powder was applied onto the surface of each piece. Methylene chloride was then added. As it was added, the pigment integrated itself gradually to the surface of the plastic material. Afterwards, the pieces were covered with a layer of transparent catalysed resin in order to glue solidly the pigment to the plastic material.

These three methods of application proved to be very efficient when applying a layer of mineral pigments at the surface of a plastic material.

The first method allowed creation of marbling effects at the surface of the plastic, whether it was transparent or opaque. Therefore, it showed that it is possible to fabricate decorative plastic surfaces imitating marble. Not only can one imitate marble, but also the colours of the marbling can vary according to the colour of the mineral pigment that is used.

The second method allowed obtention of a tinted varnish or an opaque paint, depending on the pigment's potential to make opaque, permitting to cover and thus varnish or paint the surface of the plastic material.

The third method, as the first one, allowed fabrication of decorative plastic surfaces, which imitate marble.

Thus, this particular application done exclusively on plastic surfaces could have a great impact on the interior design of buildings.

EXAMPLE No. 2

Applications of Coloured Powders as Pigments in Plastic

Almost 1000 different tests of application of mineral pigments in transparent polyester resin were carried out.

The processing followed during these tests is as follows:

50 cc of polyester resin no. 2T323 commercialized by MIA CHEMICALS were used. The selected quantity of pigments was mixed manually with a small quantity of resin and the obtained mixture was integrated into the remaining resin. The resulting mixture was then stirred with a spatula and left to decant for a few minutes. The coloured or tinted resin thus obtained was then decanted in another receptacle and 2% by weight of a polymerization catalyst were added and mixed with a spatula. After hardening at 100° F., the piece of resin obtained was unmoulded, carved and polished. The colour observations were made at point.

In order to demonstrate that the pigments according to the invention are usable in the field of design, miniature pieces were fabricated, having the form of a pyramid, of rectangular blocks and of elongated half-spheres. Looking at these forms, one can observe increasing concentrations of a same pigment going from transparency to opacity.

This distribution of the pigment is interesting because it could very well be applied to furniture, to the bodies of cars fabricated with resin, to boats, etc.

The pigments which have been tested, included in particular the natural mineral pigments numbered 11, 34, 96, 526, 537, 607, 621, 1138 and 2207 in Table I, and the heat treated pigments numbered 4226 and 4789 in the same Table. Each of these thirteen pigments was applied successively in various proportions of 0.12 g, 0.5 g, 0.1 g, which resulted in three curves of varying concentrations of a same colour. The natural pigments numbered 92 and 563 were also tested with different successive proportions of 0.18 g, 0.12 g and 0.6 g.

The visual effect, which was obtained, was similar to that of the rainbow. However, instead of having different colours, strata of a same colour differing in tonalities were obtained.

Other conditions of application are possible and can result in a variety of colours or of qualities of a same colour. Thus, for example, the catalyst may be added firstly to the resin; the mineral powder, secondly and the resulting product may then be mixed while the resin is still liquid, in ambient air or in a controlled atmosphere with or without heat treatment. The quantity of catalyst may of course vary.

Generally, the tests which were carried out showed that the mineral pigments, transformed according to the invention can be applied to transparent polyester resin.

The colours of all the mineral pigments which even transformed, became more vivid and their quality was frequently modified totally or partially when applied in transparent polyester resin.

Certain mineral pigments, natural or transformed, react as dyes in transparent polyester resin. In other words, they "tint" the resin, with an intensity which varies according to the degree of concentration of the pigment. In this case, the mineral pigment does not give opaque colours; the resin remains translucid, and even transparent with a more or less accentuated tint.

Other pigments, either natural or transformed, react as "colorants" in transparent polyester resin. The colour reaches a degree of saturation, even when there is a small quantity of such pigment. The quantity required to saturate the colour, depends on each mineral. Generally, these pigments make the resin opaque very easily.

An increasing concentration of certain mineral pigments, either natural or transformed, gives a resin with an aspect ranging from transparency to opacity. Such an increasing concentration of mineral pigments, also modifies the colour or the quality of the colour.

Tests of transformation by irradiation of the tints or colours of the pieces of polyester resin that were so prepared were also carried out. These tests done in the conditions mentioned above, have shown that the colour of all the pieces of resin, whether they were tinted, coloured or transparent, changes under the action of the irradiation and that, for a same pigment, this colour changes according to the type of irradiation used and, also if the pigment is irradiated before or after it is integrated to the resin.

In this connection, one may refer to the description given in Table I of the following materials:

| Pigments irradiated independently from the resin | | Pigments applied in the resin and then irradiated with gamma rays | Pigments applied in the resin and then irradiated with electrons |
|---|---|---|---|
| gamma | electrons | | |
| 941-2 | 943-4 | 8754 | 8737/8738 |
| 915-7 | 1228-1241 | 3461 | 5527/8940 |
| 1266-7 | — | 3457 | 2828 |
| 1284-5 | — | — | — |
| 2425-6 | 1462–3 | 3586 | 3079/5462 |
| 2438 | 2852–4713 | 3449 | 2890 |
| 2438 | 2852–4713 | 3408 | 2902 |
| 8759 | 9049 to 9052 | 3197 | 2829/7222 |
| 1109 | 9008 | 3191 | 3138 |

Of course, this offers enormous possibilities of applications for decorative and/or industrial purposes.

EXAMPLE No. 3

Application of the Coloured Powders as Pigments in Cement

Tests of application of many coloured powders according to the invention were carried out in white Portland cement (type 10 ACNOR/CSA A5).

a) Cement mixed with water

During these tests, different quantities of powders according to the invention were used as pigments. These powders were mixed with cement and water. Except for a few cases, the mixing conditions were the same. During the tests, the selected quantity of pigment was mixed with 4.50 g of white Portland cement and 3 cc of water or with 27.40 g of cement and 13 cc of water. Grinding and blending of the mixture were carried out manually. The product so obtained was then moulded in a plastic container and left to harden in ambient air.

These tests have proven that all the tested mineral pigments may be applied adequately in concrete when it is mixed with water.

Certain mineral pigments according to the invention have coloured the concrete. Thus, for example:

0.50 g of the powder numbered 487 in Table I added to 4.50 g of cement, gave, in the conditions mentioned hereinabove, a piece of cement which had a light bluish turquoise blue colour;

1 g of the powder numbered 934 added to 4.50 g of cement, gave a piece of cement which was of a very light bluish green; and 1 g of powder numbered 4060 added to 27.40 g of cement gave a piece of cement which had a very light chamois colour.

Other mineral pigments according to the invention have tinted the concrete cement and given a texture to the concrete fabricated with this tinted cement.

By way of examples, such tests have proved that the grey soapstone which generally produces beige, pinkish beige and very light greyish beige tints, actually gives a pearly finish to the concrete cement when it is used in it. Therefore, the grey soapstone reacts positively by giving a texture to concrete, even if it gives just a slight tint to the material instead of a strong colour.

Of course, other mineral pigments could be added to obtain different tints or colours. By way of example, blue asbestos added to it in its natural state and when applied in white cement, gives to the same a pearly texture while remaining a "clear and cold grey". Chrysocolla previously treated with nitric acid, also gives a pearly texture to white cement.

By way of examples of a pearly texture that were so obtained, one may refer to the description given in Table I of the materials identified by the numbers 3895 to 3897; 4758 and 4759; 5093 to 5093.2; 6463; 8545 to 8548, 8638 to 8641; 9405 and 9406; etc.

By way of examples of a metallic texture which may be obtained, we may refer to the description given in Table I of the materials 526 and 1138.

It should be noted that, generally, the colours obtained by mixing white cement with water and mineral pigment are pastels. A few tests carried out with grey cement, gave "tints" rather than colours, except in a few cases. All of this obviously depends on the quality of the pigment being applied. In this connection, one may refer to the description given in Table I of material 2065 where, a same pigment applied successively in amounts of 1, 2, 3 and 6 g to a same amount of cement (4 g) mixed with 6 cc of water, gave colours that are respectively pastel azure, intense azure, very powerful azure and finally greenish blue.

By increasing the amount of mineral pigment that is used, one may therefore intensify the tint or the colour obtained. One may even obtain a change of colour.

It should also be noted that, after the application of the mineral in the cement, the latter may be exposed to irradiation and/or to heat treatment, as it has been explained hereinabove, in order to obtain changes of colour, tint and/or texture. By way of non-restrictive examples, one may refer to the description given in Table I of the materials numbered 1071 and 3142 (irradiation with gamma rays); 4148 to 4150; 7295 to 7297 and 5347 to 5354 (heat treatment); or 4034.1 (irradiation and heat treatment).

It should further be noted that no "secondary" effect has been noticed in the case of irradiation treatment. However, heat treatment has weakened the cement, which cracked and became friable.

b) Polymer Cement

Similar tests were made with a cement mixed with a polymer composition used for concrete. This composition was made of a polyester concrete resin of the type C-001 (Fiberglass Canada Inc.), a CADOX® M-50 (Akzo Chemicals Inc.) polymerization initiator and a 6%-cobalt based accelerator sold by Dussels Campbell Ltd.

During these tests, the pigment at the state of powder was weighed. It was mixed with 6 cc of polymer for concrete, 0.18 cc of catalyst and 1.50 mg of cobalt 6%. 4 g of white Portland cement were then added. After manual crushing and grinding, pieces of cement were moulded and left to harden in ambient air.

Generally, there is a compatibility between the mineral pigments, the cement and the polymer for concrete. The colours that are obtained are very vivid, even when the pigments are used in weak quantities. Amongst these colours, pastel tones were not found, as were the majority of the colours obtained when the pigments were mixed with white Portland cement and water. The colours are vivid when the cement is mixed with polymer concrete.

By way of examples of the results that were obtained, one may refer to the description given in Table I of the materials numbered 546, 581, 1371, 2207, 3147, 3287, 3730, 4285, 8640.

As previously mentioned, one may obtain a variation and, furthermore, a change of colour by increasing the quantity of the pigments (see the description of the materials numbered 971 and 972). In practice, it was observed that the addition of cement may start reactions. The appearance of certain colours is good in polymer, but they modify themselves when they come into contact with the cement, which can make the colour dull or put it out, giving it a milky or greyish tint (see the description of the material numbered 973).

Furthermore, it was observed that certain pigments, particularly iron oxides, are naturally siccative when they are applied in concrete polymer.

Therefore, some mineral pigments colour the cement mixed with concrete polymer; others tint it. It all depends on the nature of such a pigment or, still, on the amount of the same that is applied. Some pigments also give a texture to the cement mixed with the polymer (see the description of the materials numbered 367, 8639 and 8640, 9406, etc.).

Once again, the cement may also undergo heat treatment or irradiation (see the description of the materials numbered 966, 1218 to 1220, and 2065, who have all been treated with gamma rays).

EXAMPLE No. 4
Application of Galena Powder on and in Cement a) Tests of application of galena on cement have been carried out.

During these tests, a galena powder was applied onto the surface of a piece of humid or dried cement and, then, was subjected to a heat treatment. When the galena melted, it formed a decorative coloured glaze. The colour varied according to the treatment temperature.

By way of examples, one may refer to the description given in Table I of the materials numbered 1516 and 1517, 3063, 3064 (for which a treatment by irradiation has also been carried out), 6621 and 7810 to 7813.

It is worth noting that the galena deposited on the surface of a humid piece of cement becomes impregnated with the cement when the latter is drying and hardening. After heat treatment, the glaze which is formed is not really apparent. In order to obtain a glaze which is very evident and clearly "articulated", it is better to apply the galena on the cement after drying of the latter.

From a practical standpoint, the colour of the glaze varies according to the thickness of the layer of galena powder applied onto the surface of the cement. For example, at a same temperature, if the layer is thin, the glaze may be "yellow" or "orange" and flat. However, if the layer is thick, the glaze may be "green" and brilliant.

The colour of the glaze at the surface of the cement varies according to the pigments or the chemical products which are integrated to the mass of cement. The components within the cement influence the colour of the glaze on its surface, when heat treated.

b) Other application tests with galena were carried out, but in the cement rather than on the cement. These tests showed that galena does not only colour the cement, but also reinforces it since it cracks and breaks under the action of the heat.

EXAMPLE No. 5
Application of the Coloured Powders on and in the Glass a) Application of galena powder on a window pane Galena was crushed to a fine powder state. A selected quantity of this powder was applied on a piece of window pane measuring 1"×1"×⅛", which was then inserted in a cold furnace. The temperature was raised to a selected value in a gradual manner. Likewise, the cooling was done slowly in the furnace.

The tests that were carried out, showed that galena forms a glaze which adheres permanently to the window pane and that colours and colour qualities are obtained, which differ when a same amount of galena applied on the glass is heat treated at different temperatures (see the materials numbered 2466, 3357, 3375, 3376 and 3842 in Table I).

These tests also showed that, when one combines galena to one or more other natural (ex.: sulphur) or transformed mineral(s), colours or qualities of colour are obtained, which differ from those obtained by heat treatment in combination with a chemical product (see the materials numbered 2575, 2703, 3377, 3778 and 3940 in Table I).

b) Application of the coloured powders on Pyrex®

Pyrex test tubes were used for this purpose.

Firstly, the round far end of the tube was heated on its exterior by means of an oxyacetylene welding torch. Afterwards, a selected quantity of pigment was sprinkled on this surface, while it was in a state of heat expansion. The pigment adhered to the tube, which was immediately reheated with the oxyacetylene torch until the desired effect was reached. The cooling in ambient air was immediate (withdrawal of the torch).

A first test with galena (see material 3834.1 in Table I) gave a flat and translucid glaze.

A second test with tellurium gave a flat glaze, milky and translucid, resembling frost (see material 681.1 in Table I).

An almost transparent glaze was formed during a third test with molybdenite, which had previously been heated from 0° F. to 1300° F. and maintained at 1300° F. during 4 hours (see material No. 2998.1 in Table I).

These three glazes were irradiated with gamma rays. Such gave other colours or qualities of colour.

c) Application of powders on molten glass

Approximately 150 g of molten glass of the type used by glass-blowers, which is called "sodalime", was taken with a metal rod at a state of fusion in a furnace at 1200° F. Mineral powder was sprinkled on the surface of the molten glass, or the molten glass was rolled in the mineral powder, depending on the case. The resulting product was then reintroduced into the furnace and melted with a flame of 1200° C. The molten glass was then taken off the metal rod.

Five mineral powders were tested as pigments on the surface of sodalime glass: tellurium, selenium, galena, sulphur and molybdenite.

Each of these mineral powders reacted differently at the surface of the glass.

Tellurium formed a glaze which adhered permanently. This glaze was translucid, of a "clear yellowish cream" colour, with a flat and milky texture. In this case, a greater quantity of pigment lightly accentuated the colour and the impression of frost (see the materials numbered 561.2 and 561.3 in Table I).

Galena formed an opaque glaze, which adhered permanently to the sodalime glass. This glaze was generally a "yellowish olive green" and increased in intensity as the quantity of pigment increased. This glaze gave to the glass the impression of having the earthy texture of ceramic. It was simultaneously flat and brilliant, depending on the areas (see the powders numbered 2399.1; 2452.1 and 2462.1 in Table I).

Molybdenite formed a glaze, which adhered permanently on the sodalime glass. This flat glaze was almost as transparent as a film. Before its application, the molybdenite had previously been heated at 1300° F. and maintained at this temperature during 4 hours, turning into a "clear yellow" pigment. This pigment is the one that was applied on the sodalime glass (see the material numbered 3108 in Table I).

After application of selenium in the molten glass, the latter remained "transparent white". The piece of glass, at the state of fusion, was rolled in the selenium powder. At that time, the glass was covered with what seemed to be a layer of red pigment. However, after having been reinserted into the furnace and reheated, this layer of red pigment disappeared and the glass just became "transparent white".

Finally, 1 g of sulphur was applied on 150 g of sodalime. This gave a very "cristalline white" glass.

d) Application of powders in crystal

Some extremely satisfying tests were carried out in crystal. During these tests, 1% or 2% of mineral powder was integrated to the molten glass before it was blown. The mixture was mixed and melted at 2400° F. The crystal that was so obtained was coloured or tinted, but remained translucid.

By way of examples, one may refer to the materials numbered 1139.1; 1840.1; 2028.1 and 2501.1 in Table I.

e) Application of powders in white transparent glass

Selected quantities of mineral powders were applied in 6.50 g of white transparent glass powder. The glass powder was a crudely crushed glass, called "spruce pine batch". Because the crushing of the glass was more or less appropriate, the powder used was of the size of coarse salt. Once the mixture was made, the mass obtained was put on a ceramic plate and the whole was heated in a Pyradia furnace in ambient air from 0° C. up to 1000° C. Once the temperature of 1000° C. was reached, heating was stopped and the glass was left in the furnace, which cooled down progressively.

This coloured, tinted or gave a texture to the glass.

By way of examples, one may refer to the materials numbered 2208.1 or 2960.1; 1514.1 or 4764.1; 1020.1 or 1102.1 (very bright colours); 2960.1 or 9350.1 (tints); 6751.1 or 8152.1 (texture); and 1576.2 or 2630.1 (medley of colours).

f) Application of powders in Pyrex®

By proceeding in a similar manner, tests were done successfully in Pyrex®.

By way of examples, one may refer to the materials numbered 923.1; 2730.1 and 9731.1 in Table I.

g) Irradiation

As in the case of the other tested materials, the colour or quality of colour of a glass in or on which a mineral powder has been applied according to the invention may be modified by irradiation.

In this connection, one may refer to the following materials given by way of non-restrictive only examples in Table I.

| No. | Type of irradiation | Type of glass |
|---|---|---|
| 2026.1 | gamma | crystal |
| 3834.1 | gamma | Pyrex ® |
| 2960.1 | gamma | spruce pine batch |

The colour or quality of colour obtained with a pigment applied at the surface or integrated to the mass of glass may also be modified with other types of irradiation (ex.: electrons, neutrons, X-rays, etc.). In fact, the colour or quality of colour of the glass may be modified by combining various types of irradiation, as it was the case for certain minerals (see the materials numbered 911, 985, 1097, 3225, 3840, 4916, 8068, 8537, 8539, 8698, 8882, 10028 to 10032, 10036, 10038 and 10094 in Table I).

The conditions of irradiation may vary. Thus, for example, the glass may be hot at the time of irradiation or the irradiation may be carried out in a controlled atmosphere.

Melting of the glass may also be carried out by irradiation with a laser beam. The powerful and sudden thermal shock, which the laser beam produces, does not only give interesting modifications of the colour. As a matter of fact, it also gives modification to the material as such.

Finally, transformation of the colour or quality of colour by irradiation may also be applied to materials which have glass as one of their components, whatever be the type of such materials (ex.: Corningware®).

EXAMPLE No. 6

Application of Coloured Powders in the Paper Pulp

Tests of application of mineral pigments to the invention in the paper pulp were done at the Reed Company in Québec City. The paper pulp, used for this purpose, was of a commercial whitened sulphite type (85% white).

During these tests, the pigment was firstly reduced to a powder state with a steel pestle and a bronze mortar. A given amount of this powder was added to 5.60 g or 6.70 g of humid paper pulp, as well as up to 500 ml of water. The mixture was stirred in an industrial blender and the obtained paper pulp was transformed into sheets according to standard process. The sheets thus obtained were dried in ambient air between two blotters maintained between two metal plates.

All the tests, which were thus carried out, were satisfactory. The mineral powders that were tested gave interesting colours or qualities of colour to paper pulp.

| No. of the powder in Table 1 | Method of application | Colour Obtained |
|---|---|---|
| a) Normal Colouring Tests | | |
| 4818 | 1 g with 6.70 g of paper pulp (addition of 500 ml of water/mixing in blender/formation of the sheet with the "British shut machine"/drying between blotters) | clear orange |
| 4226 | .02 g with 5.60 g of paper pulp | very clear rose Burgundy |
| 4226 | .05 g with 5.60 g of paper pulp | clear red Burgundy |
| 4226 | .20 g with 5.60 g of paper pulp | red Burgundy |
| 4226 | .50 g with 5.60 g of paper pulp | red Burgundy more accentuated than the "red Burgundy" |
| 4226 | 1 g with 5.60 g of paper pulp | red Burgundy still more accentuated |
| b) Tests of Tint | | |
| 581 | 1 g with 6.70 g of paper pulp | very clear cream |
| c) Tests of Texture (Pearly Effect) | | |
| 367 | 1 g with 6.70 g of paper pulp | very clear pearly grey |
| d) Tests of Texture ("Fibrous" Effect) | | |
| 11 | 1 g with 6.70 g of paper pulp | clear grey |
| 11 | 3 g with 6.70 g of paper pulp | grey more accentuated than the "clear grey" |
| 11 | 8 g with 6.0 g of paper pulp | grey still more accentuated |
| e) Tests of Texture (Metallic Effect) | | |
| 1138 | 1 g with 5.60 g of paper pulp | metallic grey |
| 1138 | 3 g with 5.60 g of paper pulp | more accentuated metallic grey |

This positive result is very interesting because of the possible applications in the field of interior and exterior building planning.

Thus, in the case of interior planning, the mineral powders according to the invention could be used for the fabrication of wallpaper or for the colouring of arborite or formica prepared with coloured paper. This could have interesting consequences for the interior planning of buildings (wall panels, kitchen counters, furnitures, wall coverings, etc.).

In the case of exterior planning, the mineral nature and the non vulnerability to solar rays of most of the powders according to the invention would also make it possible to use products fabricated with coloured paper, such as arborite, something which has never been done yet.

EXAMPLE No. 7
Application of Coloured Powders to Enamel Paint

Mineral powders according to the invention were tested as pigments in a opaque white enamel metal paint used for domestic purposes.

For this purpose, predetermined amounts of 0.25 g, 1 g, 1.50 g and 2 g of mineral powders were successively applied in 1 cc of white opaque metal paint used for domestic purposes or 1 cc of white transparent and white opaque paint used for painting car bodies (Supermax® P-875 and P-002).

The pigments were mixed with the paint and grinded manually with a frosted glass knurl on a frosted glass plate. The paint was applied with a brush on pieces of metal measuring 5"×5".

These tests were all positive whatever were the powders. They also showed that the use in "normal" quantities of these powders did not affect the adhesion, the viscosity or the speed of drying of the paint.

These tests further showed that some mineral pigments colour the opaque or transparent white enamel paint; others tint it. In the latter case, the effect is similar to a tinted varnish. These same pigments always become opaque, however, when they are mixed with an opaque white paint.

Other mineral pigments gave a texture to the opaque or transparent white enamel paint. After application on the metal, the colour was like a texture.

| No. of the powder used for the test in Table I | Transparent white paint | White Opaque paint |
|---|---|---|
| 105 | 1 g + 1 cc of paint/ manual grinding/ application with a brush = dark metallic grey (gold reflection) | 1 g + 1 cc of paint/ manual grinding/ application with a brush = clear metallic grey |
| 1138 | .25 g + 1 cc of paint/ manual grinding/application with a brush = clear iron grey | .25 g + 1 cc of paint/ manual grinding/ application with a brush = dark metallic grey |
| 2629 | 1 g + 1 cc of paint/ manual grinding/application with a brush = grey (almost black) | 1 g + 1 cc of paint/ manual grinding/ application with a brush = medium iron grey (light blue reflection) |
| 3730 | .25 g + 1 cc of paint/ manual grinding/ application with a brush = medium brown (orange tone) | .25 g + 1 cc of paint/ manual grinding/ application with a brush = clear beige (orange tone) |
| 4745 | .25 g + 1 cc of paint/ manual grinding/ application with a brush = medium rusty orange | .25 g + 1 cc of paint/ manual grinding/ application with a brush = clear beige (pinkish orange tone) |
| 4810 | .25 g + 1 cc of paint/ manual grinding/ application with a brush = brownish orange (light pink tone) | .25 g + 1 cc of paint/ manual grinding/ application with a brush = pinkish chamois |

Tests for resistance to the solar rays were also carried out. For this purpose, samples were exposed in a window, in the upper part of a two storey house, oriented directly towards the South. These samples were sticked on a carton, covered with an ordinary glass-pane. The duration of the exposition was more than 10 months (from the 3rd of December 1989 to the 15th of October 1990).

| No. of the powder in Table I | Preparation of the paint | Colour obtained after the preparation | Colour obtained after the exposition |
|---|---|---|---|
| 3649 | 1 g + 1 cc of opaque white/manual grinding/application with a brush | clear beige (salmon tone) | more accentuated beige (salmon tone with a more pronounced orange aspect) |
| 3650 | 1 g + 1 cc of opaque white/manual grinding/application with a brush | beige considerably darker than the previous (orange tone more acute) | beige more accentuated (orange tone more acute) |
| 3651 | 1 g + 1 cc of opaque white/manual grinding/application with a brush | beige less dark than the previous (orange tone more accentuated) | beige more accentuated (orange tone more acute) |
| 3652 | 1 g + 1 cc of opaque white/ manual beige grinding/application with a brush | pale brownish (light orange or pink tone) | pale brownish beige more accentuated (orange more acute) |
| 3732 | .50 g + 1 cc of opaque white/ manual grinding/ application with a brush | pinkish chamois (light grey tone) | lightly clearer chamois (purplish pink tone) |

Resistance tests showed that the colour of the majority of the samples accentuated itself when it was exposed to solar radiation. This reaction corresponds to the one obtained during the gamma radiation of the mineral pigments: the colour accentuates itself instead of becoming more pale as it happens with the majority of the pigments presently in use.

Therefore, it is evident that the mineral powders according to the invention can be applied successfully to synthetic enamel paint. The mineral colours applied do not deteriorate with the passage of time, even when they are exposed to solar radiation, as it happens with cars within a year. On the contrary, they ameliorate themselves.

This durability is a major asset for metallic interior and exterior coverings of buildings and even for the construction of metallic roofs.

Irradiation tests on the pieces of metal painted with an enamel paint for cars, which were coloured with powders according to the invention, were also carried out.

These pieces were irradiated at the Irradiation Center of Canada at the Armand Frappier Institute, in a UC-15 calibrator.

Many samples of a same piece were irradiated successively at various intensities, in order to produce a range of colours or qualities of colour and to identify the transformation thresholds. The different doses applied were: 3.33; 5; 7.54; 10; 11.31; 15.08; 18.85; 57.4; 102.4; 201.6; 247.6 and 360 Mrad.

| No. of the powder in Table I | Preparation and application | Colour obtained after application | Nos. of the powder after irradiation in Table I |
|---|---|---|---|
| 73 | 1 g + 1 cc of transparent white/ manual grinding/ application with a brush | medium beige | 8613/4521/6860 7771/9023 |

-continued

| No. of the powder in Table I | Preparation and application | Colour obtained after application | Nos. of the powder after irradiation in Table I |
|---|---|---|---|
| 163 | 1 g + cc of transparent white/ manual grinding/ application with a brush | cream | 6431/2133 to 2135/2153 to 2158 |
| 254 | 1 g + 1 cc of transparent white/ manual grind- ing/application with a brush | clear yellowish beige | 9060/2259/2260 9846/9061/7737 9066 |
| 410 | 1 g + 1 cc of transparent white/ manual grinding/ application with a brush | cream (beige tone) | 664/2142/2143 7524/5652 |

Therefore, one can transform the colour or quality of colour of a synthetic enamel paint, either transparent white or opaque white, by irradiation with gamma rays. It follows that the colour of an object already fabricated and painted may be modified by this type of irradiation.

One may also note that the colour of the enamel paint evolves according to the degree of irradiation. Thus, one can obtain a range of colours or qualities of colour by using the same mineral pigment.

Conclusion

As one may now understand, the coloured powders according to the invention are usable as pigments in many fields. In addition to the applications described above, numerous other tests of application have been carried out successfully on materials as diverse as inks (notably those usable in serigraphy), stone, porcelain, ceramic, latex paint, metallic coverings, etc.

This confirms that the present invention offers a complete system of colours which, by their mineral nature are particularly useful for colouring modern architectural materials.

Of course, various modifications could be made to the colour system as well as to the processes of preparation and methods of application which have just been described hereinabove without, however, departing the scope of the present invention, as it is defined in the appended claims.

What is claimed is:

1. A colored powder, comprising one or more powders whose color is produced by soaking at room temperature one or more mineral, plant or animal-derived powder(s)
   a) in a concentrated acetic, nitric, hydrochloric, sulphuric, or phosphoric acid and mixtures thereof in a ratio of about 0.10 g of pigment per about 80 ml of acid to about 250 g of pigment per about 2000 ml of acid, letting immediately dry at room temperature or heating immediately on a hot plate or soaking said pigment in acid for about a few minutes to about 4 years, separating the pigment from the acid and letting them dry separately at room temperature, or by heating on a hot plate or desiccating or on a sand bath or in an oven until all the liquid is evaporated and collecting two different pigments from said acid portion and said solid portion, or letting said pigment in acid dry at room temperature or by desiccating or by heating on a hot plate or a sand bath or in a oven until all the liquid is evaporated and collecting one or a few layers of differently colored pigments, and optionally repeating said acid treatment to produce additional differently colored pigments, wherein said powder(s) are selected from the group consisting of:

actinolite, blue lace agate, bloody agate, grey agate, Gaspé agate, tiger-eye agate, green agate, almandite, amazon stone, amazonite, analcime, andulusite, anorthosite, antigorite, apatite, apophyllite, armenite, asbestos, bauxite, beryl, bornite, calcite, calcite with clayey inclusions, fluorescent calcite, cement, cerite, chalcocite, chalcopyrite, chromite, chrysocolla, clay, coal, cobalt sulphide, copper, copper concentrate (Cu—FeS), corundum, crocidolite, cryolite, diopside, dolomite, epidote, solid epidote, fluorine, gneiss, graphite, gypsum, halite, hornblende, hypersthene, iron pyrite, iron sulphide-nickel, jade, labrador, labradorite, magnetite, malachite, mica, microcline, molybdenite, mussel shell, nickel sulphide, obsidian, olivine, orthoclase, pentlandite, obsidian, olivine, orthoclase, pentlandite, peridotite, polylithionite, pyrite, pyrochlore, pyrolusite, pyrophillite, nickeliferous pyrrhotite, pyrrhotite, quartz, quartz-mica, sandstone, sardonyx, serandite, serpentine, Sillery shale, sericite shale, sideritet silica, smaltite, fuel oil soot, spodumene, steatite, stibnite, stilbite, tourmaline, tremolite, uraninite, vesuvianite, wilsonite, yofortierite, zincite and mixtures thereof, wherein, if the mineral is copper, it is treated only with ether;
   if nickel sulphide or stibnite, only with phosphoric acid;

or b) in concentrated hydrofluoric acid in a ratio of about 1 g to about 5 g of pigment per about 20 ml of hydrofluoric acid;

or c) in ammonia or ether in a ratio of about 0.50 g of pigment per about 1 ml of ammonia to about 5 g of pigment per about 25 ml of ammonia;

or d) in a cyanide solution comprising about 50.26 g of potassium cyanide per about 1 liter of distilled water, in a ratio of about 3 g of pigment per about 20 ml of said solution;

or e) in concentrated hydrochloric acid in a ratio of about 50 g of pigment per about 200 ml of hydrochloric acid or entirely covering said pigment with hydrochloric acid, drying said pigment and liquid and mixing the resulting pigment with another mineral powder, a supplemental compound or mixtures thereof, selected from the group consisting of sodium carbonate, potassium carbonate, titanium dioxide or zirconium silicate, in a weight ratio of about 1 to 1;

or f) in concentrated hydrochloric acid in a ratio of about 50 g of pigment per about 200 ml of hydrochloric acid or entirely covering the pigment with hydrochloric acid, drying said pigment and liquid and mixing the resulting pigment with a metal salt in a ratio of about 0.50 g of said pigment per about 0.50 g of sodium carbonate, soaking the resulting pigment at room temperature for about 5 days in concentrated nitric or hydrochloric acid or mixtures thereof in a ratio of about 1 g of pigment per about 40 ml of acid, separating the acid from the solid, heating separately said solid and said acid on a sand bath or a hot plate until all the liquid is evaporated and collecting two different pigments from said acid and said solid, and optionally mixing the powders made by the above processes.

2. The colored powder of claim 1, wherein the mineral powder is malachite, which is produced by soaking in ammonia at room temperature in a ratio of about 5 g of pigment per about 25 ml of ammonia until all the liquid is evaporated, and then soaking the resulting pigment in concentrated phosphoric acid for about 3 days in a ratio of about 2 g of pigment per about 20 ml of phosphoric acid, separating the acid from the solid, heating separately said acid and said solid on a hot plate until all the liquid is evaporated and collecting two different pigments from said acid and said solid, and optionally mixing the powders made by the above processes.

3. A colored powder, comprising one or more powders whose color is produced by soaking steatite or goethite or mixtures thereof at room temperature in a tartaric acid solution comprising about 15 g of tartaric acid and about 10 ml of concentrated hydrochloric acid per about 100 ml of distilled water, for about 3 days in a ratio of about 2 g of pigment per about 20 ml of said tartaric acid solution and heating said pigment in the tartaric acid solution on a hot plate until all the liquid is evaporated, and optionally mixing the powders made by the above processes.

4. A colored powder, comprising one or more powders produced by soaking copper at room temperature in concentrated acetic or nitric or hydrochloric acid or mixtures thereof in a ratio of about 100 g of pigment per about 100 ml of acid to about 100 g of pigment per about 1000 ml of acid, letting said pigment in liquid dry at room temperature or, a) after soaking for about 3 days to about 5 months, heating said pigment in liquid on a hot plate until all the liquid is evaporated, and then soaking the resulting pigment in ammonia at room temperature in a ratio of about 0.50 g of pigment per about 1 ml of ammonia to about 5 g of pigment per about 25 ml of ammonia and letting said pigment in ammonia dry at room temperature until all the liquid is evaporated, or b) soaking the resulting pigment in ether at room temperature in a ratio of about 4 g of pigment per about 20 ml of ether and letting said pigment in ether dry at room temperature until all the liquid is evaporated;

or c) soaking the resulting pigment in concentrated phosphoric acid at room temperature in a ratio of about 2 g of pigment per about 20 ml of acid to about 50 g of pigment per about 100 ml of acid, heating said solid in acid on a hot plate until all the liquid is evaporated or separating the acid from the solid, heating separately said solid and said acid on a hot plate until all the liquid is evaporated and collecting two different pigments from said acid and said solid, and optionally mixing the powders made by the above processes.

5. A material, selected from the group consisting of polyesters, acrylics, synthetic alkyds, ink, enamel paint, glass, metal, porcelain, rack and cement, which is produced by applying into or onto said material one or more of the natural or transformed mineral, plant or animal-derived powders of any one of claims 1–4 and further subjecting such a mixture to at least one thermal treatment in open or hermetically sealed vessels at about 100° to about 2,280° F. and/or irradiating said material with gamma rays of about 5 Mrad to about 360 Mrad or with electrons of about 50,000 rad to about 170,000 rad, thus transforming the initial color or lack of color of the pigmented material, and optionally mixing said colored materials with one or more of the treated and/or untreated powder(s) of claims 1–4 or with different colored materials made by the above processes.

* * * * *